(12) United States Patent
Aguirre

(10) Patent No.: US 12,526,122 B2
(45) Date of Patent: Jan. 13, 2026

(54) FLEXIBLE CONFIGURATION OF INDOOR RADIOS TO FACILITATE COEXISTENCE WITH OUTDOOR RADIOS

(71) Applicant: VERIZON PATENT AND LICENSING INC., Basking Ridge, NJ (US)

(72) Inventor: Sergio Aguirre, Southlake, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 425 days.

(21) Appl. No.: 18/110,993

(22) Filed: Feb. 17, 2023

(65) Prior Publication Data

US 2024/0283626 A1    Aug. 22, 2024

(51) Int. Cl.
*H04L 5/14* (2006.01)
*H04W 24/08* (2009.01)

(52) U.S. Cl.
CPC ........... *H04L 5/1461* (2013.01); *H04W 24/08* (2013.01)

(58) Field of Classification Search
None
See application file for complete search history.

(56) References Cited

U.S. PATENT DOCUMENTS

| | | | | |
|---|---|---|---|---|
| 8,233,907 B1* | 7/2012 | Shah | .................... | H04B 17/336 455/447 |
| 8,854,981 B2* | 10/2014 | Davydov | ................ | H04L 47/70 370/252 |
| 11,026,122 B2* | 6/2021 | Zhou | ..................... | H04W 72/52 |
| 11,075,660 B2* | 7/2021 | Abdelmonem | ......... | H04L 43/16 |
| 11,082,876 B2* | 8/2021 | Huang | .................. | H04W 24/10 |
| 11,153,060 B2* | 10/2021 | Babaei | .................. | H04W 80/08 |
| 11,240,770 B2* | 2/2022 | Harada | ................ | H04L 1/0026 |
| 11,290,900 B2* | 3/2022 | Park | ..................... | H04W 24/08 |
| 11,363,474 B2* | 6/2022 | Yi | ........................ | H04B 17/318 |
| 11,818,597 B2* | 11/2023 | Lee | ...................... | B60W 30/00 |
| 11,856,439 B2* | 12/2023 | Kang | ................... | H04B 17/336 |
| 11,871,260 B2* | 1/2024 | Park | ..................... | H04W 24/08 |
| 11,882,081 B2* | 1/2024 | Gurney | ............ | H04W 72/0446 |
| 11,894,953 B2* | 2/2024 | Xu | ....................... | H04W 36/06 |
| 11,902,816 B2* | 2/2024 | Ibrahim | .................. | H04L 5/14 |
| 11,910,219 B2* | 2/2024 | Takeda | .................. | H04L 5/0051 |
| 11,910,326 B2* | 2/2024 | Burke | .................... | H04B 1/525 |
| 11,916,634 B2* | 2/2024 | Elshafie | ................ | H04B 17/24 |
| 11,963,213 B2* | 4/2024 | Sundararajan | ........ | H04L 1/0026 |
| 11,968,541 B2* | 4/2024 | Doshi | .................... | G06N 3/006 |
| 12,003,316 B2* | 6/2024 | Baldemair | .......... | H04J 11/0079 |
| 12,021,586 B2* | 6/2024 | Liu | ..................... | H04B 7/0842 |

(Continued)

*Primary Examiner* — Melvin H Pollack

(57) ABSTRACT

In some aspects, the techniques described herein relate to a method including: monitoring interference measurements of a radio in a cellular network; generating a multi-dimensional interference matrix based on the interference measurements, the multi-dimensional interference matrix storing averages of the interference measurements for a plurality of combinations of radios, frequencies, and time slots; analyzing the multi-dimensional interference matrix to determine at least one combination of the radio, frequency, and time slot in the plurality of combinations having an interference measurement exceeding a preconfigured threshold; and updating a slot configuration of the at least one combination based on the interference measurement.

20 Claims, 9 Drawing Sheets

(56) References Cited

U.S. PATENT DOCUMENTS

| | | | |
|---|---|---|---|
| 12,022,501 B2* | 6/2024 | Li | H04W 72/0446 |
| 12,047,940 B2* | 7/2024 | Sakhnini | H04W 80/02 |
| 12,074,666 B2* | 8/2024 | Park | H04B 7/0469 |
| 12,127,025 B2* | 10/2024 | Ibrahim | H04W 24/08 |
| 12,170,561 B2* | 12/2024 | Chung | H04B 7/0478 |
| 12,170,584 B2* | 12/2024 | Almquist | H04W 24/08 |
| 12,207,110 B2* | 1/2025 | Zhang | H04L 5/0053 |
| 12,207,123 B2* | 1/2025 | Hattab | H04W 24/08 |
| 12,212,523 B2* | 1/2025 | Muruganathan | H04W 56/0045 |
| 12,224,835 B2* | 2/2025 | Rahman | H04L 27/2663 |
| 12,231,940 B2* | 2/2025 | Kim | H04W 24/10 |
| 12,245,065 B2* | 3/2025 | Miao | H04W 24/10 |
| 12,261,653 B2* | 3/2025 | Venugopal | H04W 72/20 |
| 12,289,275 B2* | 4/2025 | Ibrahim | H04W 24/08 |
| 12,301,483 B2* | 5/2025 | Marzban | H04L 5/0023 |
| 12,302,150 B2* | 5/2025 | Zhang | H04W 74/0833 |
| 2010/0296401 A1* | 11/2010 | Karaoguz | H04W 24/02 370/252 |
| 2012/0106390 A1* | 5/2012 | Guo | H04W 72/542 370/252 |
| 2022/0256387 A1* | 8/2022 | Xiao | H04L 5/0035 |
| 2023/0362897 A1* | 11/2023 | Xu | H04W 72/1263 |
| 2023/0379739 A1* | 11/2023 | Kim | H04W 24/10 |
| 2023/0413196 A1* | 12/2023 | He | H04W 56/0015 |
| 2024/0015546 A1* | 1/2024 | Awadin | H04W 24/10 |
| 2024/0015730 A1* | 1/2024 | Demonget | H04L 5/0035 |
| 2024/0056267 A1* | 2/2024 | Skördeman | H04L 5/0044 |
| 2024/0163701 A1* | 5/2024 | Xu | H04W 24/10 |
| 2024/0178970 A1* | 5/2024 | Tidestav | H04L 1/1822 |
| 2024/0187128 A1* | 6/2024 | Fröberg Olsson | H04L 1/005 |
| 2024/0204845 A1* | 6/2024 | Rahman | H04B 7/048 |
| 2024/0250763 A1* | 7/2024 | Angelides | H04B 17/345 |
| 2024/0284208 A1* | 8/2024 | Mahama | H04L 5/0051 |
| 2024/0333407 A1* | 10/2024 | Yuan | H04L 5/0023 |
| 2024/0372589 A1* | 11/2024 | Nilsson | H04B 7/0626 |
| 2025/0056286 A1* | 2/2025 | Astely | H04L 5/0007 |
| 2025/0088879 A1* | 3/2025 | Li | H04L 5/0051 |

* cited by examiner

FLEXIBLE CONFIGURATION OF INDOOR RADIOS TO FACILITATE COEXISTENCE WITH OUTDOOR RADIOS

BACKGROUND INFORMATION

In a time-division duplex (TDD) configuration, different cellular networks may utilize different slot configuration based on the data usage of such networks. When networks use different slot configurations, interference may arise in one or more slots of any given radio frame, especially when the direction of traffic is not the same. Such interference reduces the throughput of one or both of the conflicting cellular networks.

DETAILED DESCRIPTION OF EXAMPLE EMBODIMENTS

Figure 1:
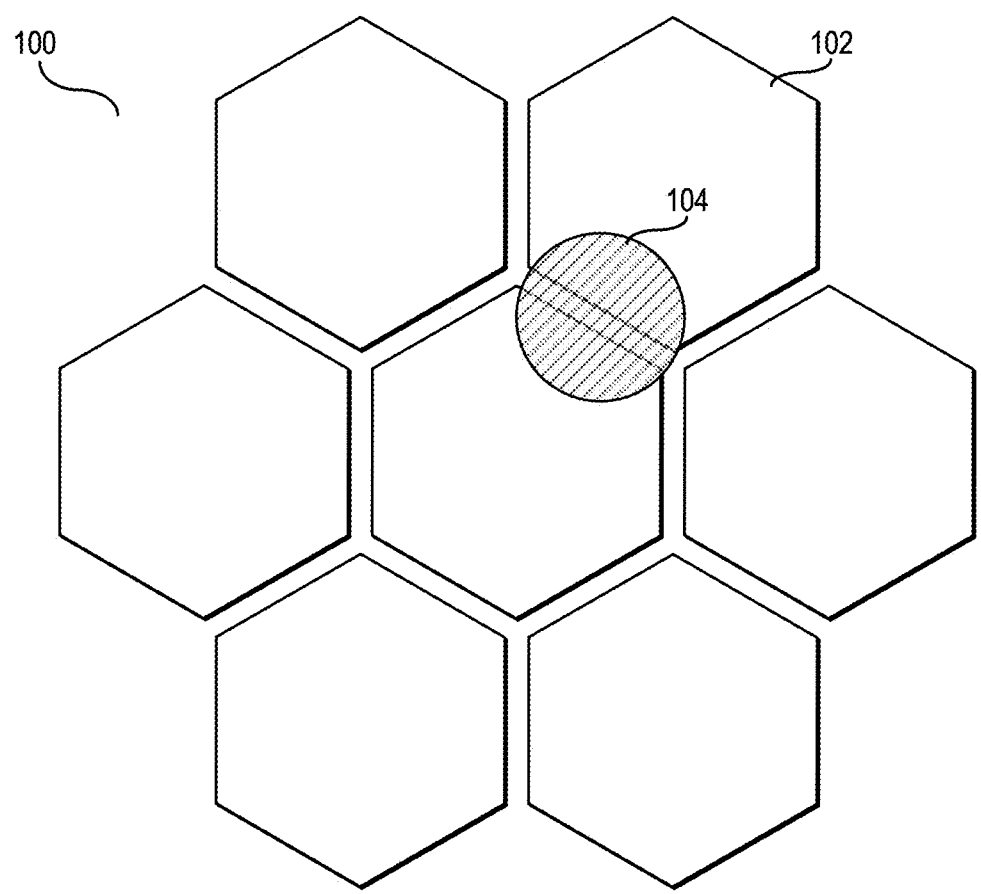
FIG. 1 is a block diagram illustrating coverage areas of a cellular network.

The disclosed embodiments relate to dynamically updating a slot configuration of a radio based on monitored interference conditions. An indoor radio system can monitor interference values and generate a corresponding multi-dimensional matrix that maps combinations of radios, frequencies, and slots to averaged interference values over a time horizon. An interference engine can then analyze the multi-dimensional matrix and determine if any of the interference values are above one or more preconfigured thresholds. If so, the interference engine can update a slot configuration of a radio by either introducing uplink redundancy or disabling transmission during affected slots.

In some aspects, the techniques described herein relate to a method that monitors interference measurements of a radio in a cellular network and generates a multi-dimensional interference matrix based on the interference measurements. The multi-dimensional interference matrix may store averages of the interference measurements for a plurality of slots, frequencies, and radios. The method can then update a slot configuration of the radio when one or more cells in the multi-dimensional interference matrix stores an interference measurement exceeding a preconfigured threshold.

In some aspects, the techniques described herein relate to a method, wherein the interference measurements include one or more available received power indicators, including without limitation received signal strength indicator (RSSI), Reference Signal Received Power (RSRP), Reference Signal Received Quality (RSRQ), Signal-to-Interference Noise Ratio (SINR), and similar such received power indicators. These values can be measured and stored by the 4G or 5G radio or an auxiliary test receiver for post-processing.

In some aspects, the techniques described herein relate to a method including: monitoring interference measurements of a radio in a cellular network; generating a multi-dimensional interference matrix based on the interference measurements, the multi-dimensional interference matrix storing averages of the interference measurements for a plurality of combinations of radios, frequencies, and time slots; analyzing the multi-dimensional interference matrix to determine at least one combination of the radio, frequency, and time slot in the plurality of combinations having an interference measurement exceeding a preconfigured threshold; and updating a slot configuration of the at least one combination based on the interference measurement.

In some aspects, the techniques described herein relate to a method, wherein the interference measurements include received power indicator measurements.

In some aspects, the techniques described herein relate to a method, wherein generating a multi-dimensional interference matrix based on the interference measurements includes generating a three-dimensional matrix, the three-dimensional matrix having dimensions for radios, frequencies used by the radios, and slot numbers within frames transmitted using the frequencies.

In some aspects, the techniques described herein relate to a method, wherein the time slots include uplink slots.

In some aspects, the techniques described herein relate to a method, wherein updating a slot configuration of the at least one combination includes: selecting a cell in the multi-dimensional interference matrix corresponding to a slot with a frequency supported by the radio; determining that one or more time slots are subject to interference exceeding preconfigured thresholds; and updating the slot configuration to include at least one redundant uplink slot.

In some aspects, the techniques described herein relate to a method, wherein updating a slot configuration of the at least one combination includes: selecting a cell in the multi-dimensional interference matrix corresponding to a slot with a frequency supported by the radio; determining that one or more time slots are subject to interference that exceed preconfigured thresholds; and puncturing the slot in the slot configuration, wherein puncturing the slot includes preventing data transmission during the slot.

In some aspects, the techniques described herein relate to a method, further including generating a second multi-dimensional interference matrix for the radio during a maintenance window and further updating the slot configuration of the radio when one or more cells in the second multi-dimensional interference matrix store an interference measurement exceeding the preconfigured threshold.

In some aspects, the techniques described herein relate to a non-transitory computer-readable storage medium for tangibly storing computer program instructions capable of being executed by a computer processor, the computer program instructions defining steps of: monitoring interference measurements of a radio in a cellular network; generating a multi-dimensional interference matrix based on the interference measurements, the multi-dimensional interference matrix storing averages of the interference measurements for a plurality of combinations of radios, frequencies, and time slots; analyzing the multi-dimensional interference matrix to determine at least one combination of the radio, frequency, and time slot in the plurality of combinations having an interference measurement exceeding a preconfigured threshold; and updating a slot configuration of the at least one combination based on the interference measurement.

In some aspects, the techniques described herein relate to a non-transitory computer-readable storage medium, wherein the interference measurements include received power indicator measurements.

In some aspects, the techniques described herein relate to a non-transitory computer-readable storage medium, wherein generating a multi-dimensional interference matrix based on the interference measurements includes generating a three-dimensional matrix, the three-dimensional matrix having dimensions for radios, frequencies used by the radios, and slot numbers within frames transmitted using the frequencies.

In some aspects, the techniques described herein relate to a non-transitory computer-readable storage medium, wherein the time slots include uplink slots.

In some aspects, the techniques described herein relate to a non-transitory computer-readable storage medium, wherein updating a slot configuration of the at least one combination includes: selecting a cell in the multi-dimensional interference matrix corresponding to a slot with a frequency supported by the radio; determining that one or more time slots are subject to interference exceeding the preconfigured thresholds; and updating the slot configuration to include at least one redundant uplink slot.

In some aspects, the techniques described herein relate to a non-transitory computer-readable storage medium, wherein updating a slot configuration of the at least one combination includes: selecting a cell in the multi-dimensional interference matrix corresponding to a slot with a frequency supported by the radio; determining that one or more time slots are subject to interference exceeding preconfigured thresholds; and puncturing the slot in the slot configuration, wherein puncturing the slot includes preventing data transmission during the slot.

In some aspects, the techniques described herein relate to a non-transitory computer-readable storage medium, the steps further including generating a second multi-dimensional interference matrix for the radio during a maintenance window and further updating the slot configuration of the radio when one or more cells in the second multi-dimensional interference matrix store an interference measurement exceeding the preconfigured threshold.

In some aspects, the techniques described herein relate to a device including: a processor configured to: monitor interference measurements of a radio in a cellular network, generate a multi-dimensional interference matrix based on the interference measurements, the multi-dimensional interference matrix storing averages of the interference measurements for a plurality of combinations of radios, frequencies, and time slots, analyzing the multi-dimensional interference matrix to determine at least one combination of the radio, frequency, and time slot in the plurality of combinations having an interference measurement exceeding a preconfigured threshold, and update a slot configuration of the at least one combination based on the interference measurement.

In some aspects, the techniques described herein relate to a device, wherein the interference measurements include received power indicator measurements.

In some aspects, the techniques described herein relate to a device, wherein generating a multi-dimensional interference matrix based on the interference measurements includes generating a three-dimensional matrix, the three-dimensional matrix having dimensions for radios, frequencies used by the radios, and slot numbers within frames transmitted using the frequencies.

In some aspects, the techniques described herein relate to a device, wherein the time slots include uplink slots.

In some aspects, the techniques described herein relate to a device, wherein updating a slot configuration of the at least one combination includes: selecting a cell in the multi-dimensional interference matrix corresponding to a slot with a frequency supported by the radio; determining that one or more time slots are subject to interference exceeding preconfigured thresholds; and updating the slot configuration to include at least one redundant uplink slot.

In some aspects, the techniques described herein relate to a device, wherein updating a slot configuration of the at least one combination includes: selecting a cell in the multi-dimensional interference matrix corresponding to a slot with a frequency supported by the radio; determining that one or more time slots are subject to interference exceeding preconfigured thresholds; and puncturing the slot in the slot configuration, wherein puncturing the slot includes preventing data transmission during the slot.

FIG. 1 is a block diagram illustrating coverage areas of a cellular network.

A cellular network 100 generally includes multiple cell sites that have corresponding over-the-air (OTA) coverage areas. Cellular network 100 illustrates a subset of such cell sites, including a macrocell 102 associated with a corresponding base station (BS). The specific number of macrocell illustrated is exemplary and non-limiting. As user equipment (UE) travels within a geographic region, the UE attaches to the macrocell. Specific handover operations are not described herein. Generally, the macrocells (including macrocell 102) will operate in accordance with a cellular network operator's configuration.

As will be described in more detail, one of these configurations is a slot configuration in a TDD cellular system. For example, current U.S. 5G system spectrum allocations require TDD, where the same set of frequencies are used for both downlink (i.e., BS-to-UE) and uplink (i.e., UE-to-BS), with previously assigned specific time slots for downlink and uplink data.

With a TDD system an operator faces the decision of selecting the ratio (D:U) of downlink (D) and uplink (U) slots that best serve the operator's use cases. Another input in the decision of a suitable ratio D:U is the need to coexist with other operators in the same geographical area, who may be using TDD systems operating in adjacent bands, or other operators in neighboring areas, who may be using TDD systems operating in the same band. As one example, the cellular network operator that operates the macrocell 102 may use an 8:2 TDD configuration (described in more detail in FIGS. 2A and 2B). An 8:2 TDD configuration is used commonly in high-power, outdoor commercial 5G systems. In this case, the operator assigns more time slots in the downlink than in the uplink. The assumption for these high-power outdoor systems is that the main use cases require heavy downlink traffic, as opposed to balanced traffic.

In addition to macrocells, additional cell coverage areas may exist that overlap with the macrocells. For example, and as illustrated, a smaller coverage area 104 may be created by the same or a different network operator. For example, a larger building may be equipped with picocell (or nanocell) stations to form a private cellular network, a neutral host, or enterprise cellular network. As illustrated in FIG. 1, this smaller coverage area 104 may overlap with one or more macrocells (e.g., macrocell 102). Such smaller cellular networks often use low-power base stations to serve users. If the TDD configurations for smaller and larger networks are identical (e.g., 8:2 TDD for both), generally speaking, the two networks can coexist without significant customized designs. However, when the slot configuration of smaller coverage area 104 conflicts with that of macrocell 102, cross-link interference can occur between the two networks.

Smaller networks such as indoor cellular systems oftentimes deviate from the traffic or applications requirements of high-power outdoor systems. Use cases such as Private Networks (PN) and Neutral Host Networks (NHN) have requirements differing from outdoor systems that result in differing slot configurations. For example, PN and NHN may require more balanced TDD ratios to better serve voice applications or augmented reality (AR) or virtual reality (VR) applications. Thus, for such use cases, a 1:1 TDD configuration is more efficient.

Figure 2A:
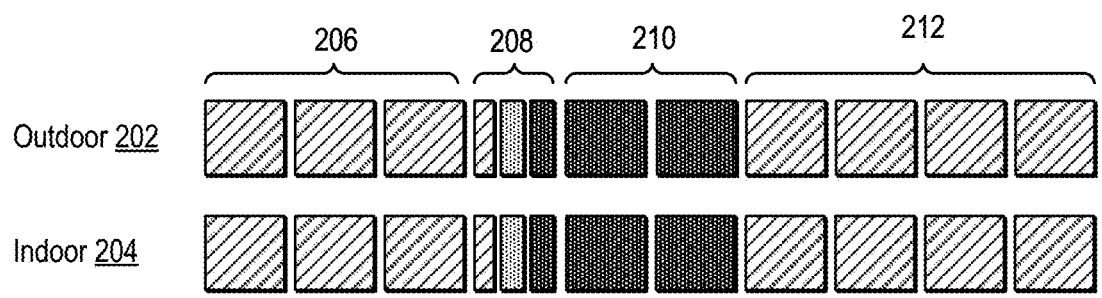
FIG. 2A is a slot diagram illustrating slot configurations of an outdoor system and indoor system with identical TDD configurations.

FIG. 2A is a slot diagram illustrating slot configurations of an outdoor system and indoor system with identical TDD configurations. While FIG. 2A (and FIG. 2B) refer to outdoor networks (e.g., macrocell-based networks) and indoor networks (e.g., smaller, private cellular networks), the disclosure is not limited to a specific geographic configuration of cell sites.

As illustrated, an outdoor system 202 uses an 8:2 TDD configuration. In this configuration, the first downlink slots 206 are configured for downlink transmissions, duplexing slot 208 for downlink and uplink transmissions separated by a guard period, uplink slots 210 for uplink transmissions, and trailing downlink slots 212 for downlink transmissions. Notably, when an indoor system 204 uses the same configuration, there is minimal interference between slots since both systems are transmitting in the same directions at the same synchronized time.

Figure 2B:
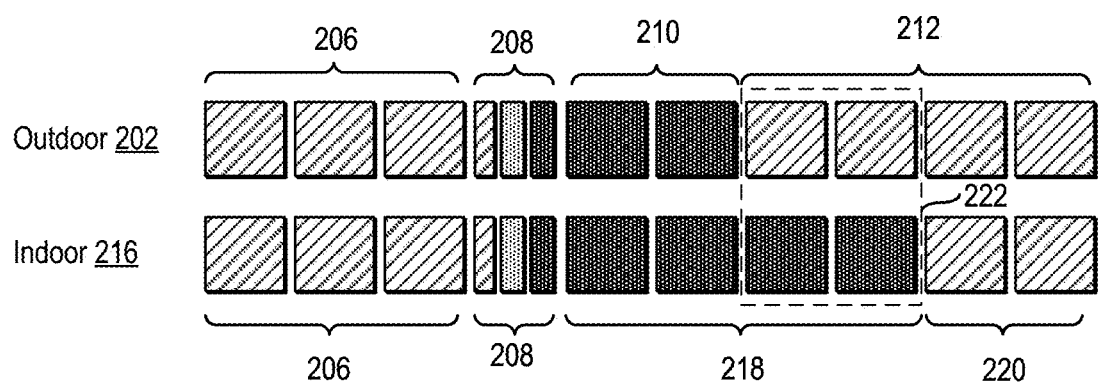
FIG. 2B is a slot diagram illustrating slot configurations of an outdoor system and indoor system when the outdoor system and indoor system are configured with different TDD configurations.

FIG. 2B is a slot diagram illustrating slot configurations of an outdoor system and indoor system when the outdoor system and indoor system are configured with different TDD configurations.

As in FIG. 2A, outdoor system 202 is configured with an 8:2 TDD configuration (e.g., first downlink slots 206, duplexing slot 208, uplink slots 210, downlink slots 212), the description of which is not repeated herein. However, indoor system 216 is configured using a 1:1 TDD configuration. In a 1:1 TDD configuration, the slot configuration likewise includes first downlink slots 206 and duplexing slot 208. However, the uplink slots 218 are increased and the trailing downlink slots 220 are reduced, resulting in an equal number of uplink and downlink slots (i.e., a 1:1 ratio). As illustrated, in slots 222 (e.g., slots 6 and 7), the outdoor system is transmitting downlink while the indoor system is attempting to transmit uplink. In this scenario, interference may occur in slots 222 due to the conflicting directions of data.

Although interference between an 8:2 TDD configuration and 1:1 TDD configuration as illustrated, and more specifically an 8:2 outdoor TDD configuration and 1:1 indoor TDD configuration, the disclosure is not limited as such.

In general, the deployment of indoor and outdoor systems, in the same vicinity, may lead to cross-link interference if the two systems use any dissimilar TDD configurations. The cross-link interference scenarios may include: gNodeB (gNB) outdoor to/from gNB indoor, gNB outdoor to/from UE indoor, gNB indoor to/from UE outdoor, and UE outdoor to/from UE indoor.

For the outdoor/indoor scenario, the most common type of cross-link interference is gNB downlink outdoor to gNB uplink indoor, due to the much higher power of the outdoor system. This interference is the one depicted in FIG. 2A when outdoor system 202 uses an 8:2 TDD configuration and indoor system 216 uses a 1:1 TDD configuration. The degradation due to cross-link interference (e.g., in slots 222) can translate into a loss of service or a reduction in system performance, including lower capacity and degraded user data rates. While the following description focuses on gNB downlink outdoor to gNB uplink indoor interference, other cross-link interference scenarios may also occur and fall within the scope of the disclosure. For example, the methods described herein may also be applied to UE-UE interference etc.

Figure 3:
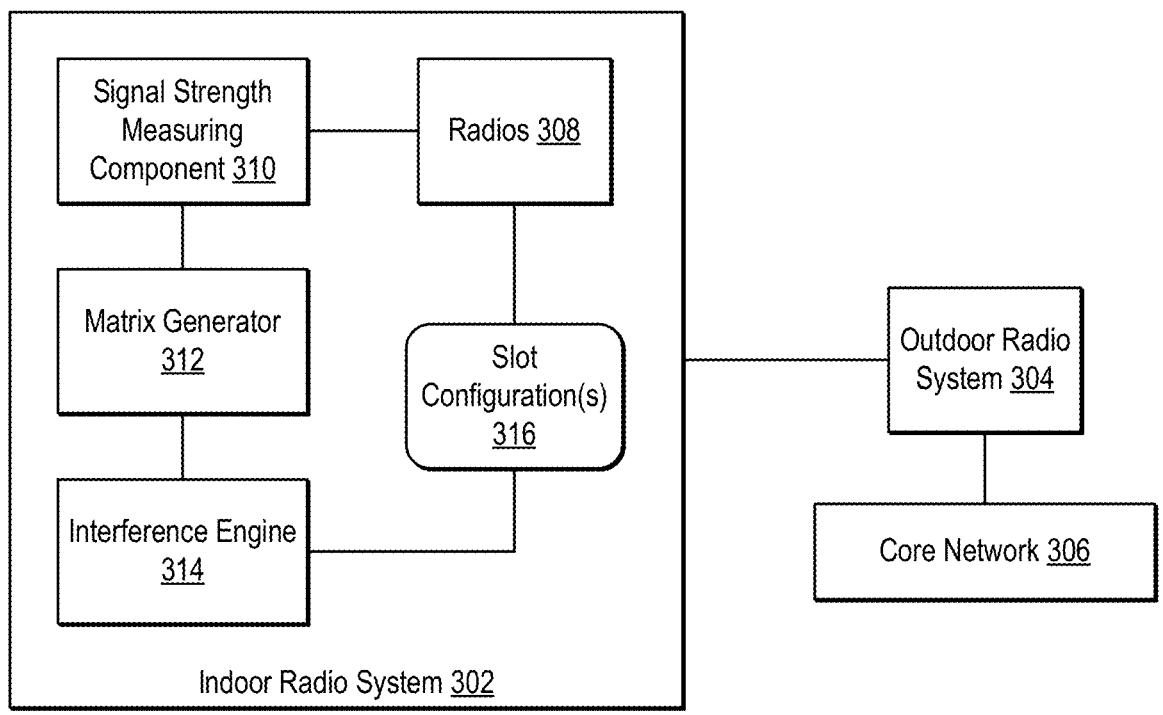
FIG. 3 is a block diagram illustrating a system that includes two cellular networks.

FIG. 3 is a block diagram illustrating a system that includes two cellular networks.

In an implementation, the system includes an indoor radio system 302 and an outdoor radio system 304. In some implementations, the outdoor radio system 304 may comprise a set of BS devices (e.g., gNodeB devices) geographically dispersed through a region. The BS devices enable radio communications with UEs (not illustrated) and support data and voice transfers between UEs and a core network 306. Specific components and functions of outdoor radio system 304 and core network 306 are described more fully in FIGS. 7 and 8 and are not repeated herein.

Indoor radio system 302 includes various components to support a private cellular network within a smaller region (as compared to a region serviced by outdoor radio system 304). For example, the indoor radio system 302 can provide an in-building cellular network for enterprises, private networks, and neutral hosts for venues, subways or other underground systems, etc. As discussed, while indoor radio system 302 is referred to as being situated "indoor," the disclosure is not limited as such. Indeed, indoor radio system 302 may in some implementations comprise a smaller outdoor cellular network coexisting with the outdoor radio system 304.

The indoor radio system 302 includes one or more radios 308. In some implementations, the one or more radios 308 may comprise smaller-scale BS devices such as a gNodeB implemented as a picocell, nanocell, or similar small-scale base station. In some implementations, the indoor radio system 302 may include multiple such radios physically distributed in a region (e.g., building, subway system, etc.). The one or more radios 308 may provide an air interface for UEs (not illustrated) in the region. The one or more radios 308 may also include a network interface to communicate with a wired or wireless backhaul (e.g., fiber-optic connection). In some implementations, the indoor radio system 302 can include its own processing devices (not illustrated) to process communications between indoor radio system 302 (and ultimately UEs) and any external devices (similar to core network 306). In other implementations, the baseband operations and radio functions may be supported by a virtual radio access network.

As illustrated, indoor radio system 302 includes a signal strength measuring component 310. In some implementations, the signal strength measuring component 310 can comprise a passive or active device (or virtual application) that measures signal strengths during TDD slots of one or more radios 308. In some implementations, the signal strength measuring component 310 can measure the received power indicators of the one or more radios 308 over time. Examples of received power indicators include RSSI, RSRP, RSRQ, SINR, and similar indicators. A given received power indicator comprises a measure of the power level of a received radio signal, usually expressed in decibels (dB) relative to a reference value. In some implementations, this reference value can be pre-configured. In some implementations, the one or more radios 308 may expose received power measurements periodically when transmitting or receiving data and component 310 can receive and temporarily store these values in a local data store (not illustrated).

Once enough measurements have been generated, a matrix generator 312 can generate a multi-dimensional matrix of signal strengths. In some implementations, this multi-dimensional matrix can comprise a three-dimensional matrix, although the disclosure is not limited to three dimensions. For convenience, the use of a multi-dimensional matrix is used herein. However, in practice, multiple recording mechanisms are possible, for example a database may be used, as long as the radio or auxiliary test receiver under test identifies uniquely the power-based interference measurements to a particular time slot, frequency or channel. In some implementations, the dimension can comprise the total number of one or more radios 308, the number of time slots under test, and the number of frequencies. In some implementations, only uplink slots may be used by matrix generator 312. In some implementations, each value of the multi-dimensional matrix corresponds to a signal strength measurement (e.g., RSSI measurement) for a combination of a radio, frequency, and slot number. In some implementations, measurements may be averaged over a fixed time horizon such that a single multi-dimensional matrix may be generated for all permutations of radios, frequencies, and time slots.

Indoor radio system 302 further includes an interference engine 314. In some implementations, the interference engine 314 receives the multi-dimensional matrix of radio, frequency, and slot data from the matrix generator 312 and analyzes the multi-dimensional matrix. During this analysis, interference engine 314 identifies which combination of radio, frequency and slot are experiencing interference. Further, during the analysis of the multi-dimensional matrix, interference engine 314 can determine the level of interference and classify the interference (as described more fully in FIG. 5). Further, in some implementations, interference engine 314 can include a machine learning (ML) model that can input one, some, or all of the entries in the multi-dimensional matrix into a predictive model that can predict a future level of interference. In some implementations, the ML model can be trained on past time-series of interference data (e.g., past matrices). In some implementations, the ML model may also support a time-series input and interference engine 314 can aggregate matrices over time and insert this time series into the ML model to predict future levels of interference. In some implementations, the ML model may comprise an autoregressive (AR) model, moving average (MA) model, autoregressive moving average (ARMA), autoregressive integrated moving average (ARIMA) model, recurrent neural network (RNN) or long short-term memory (LSTM), or convolutional neural network (CNN). In some implementations, the entire multi-dimensional matrix may be input into the model and the model may return the cells (i.e., radio, frequency, slot) that will be subject to interference.

If interference engine 314 detects that any multi-dimensional matrix cells are experiencing (or will experience) interference, it classifies or quantizes the interference, based on the measured interference level against a set of defined thresholds and generates slot configurations 316 for the affected multi-dimensional matrix cells. The defined thresholds may be calculated empirically offline, prior to radio installation. In some implementations, the slot configurations 316 can be transmitted to the radios 308 such that the radios 308 can update their slot configurations moving forward. Further the operations of component 310, matrix generator 312, and interference engine 314 can be executed continuously to dynamically update the slot configurations 316 for one or more radios 308 during operation of the indoor radio system 302.

Figure 4:
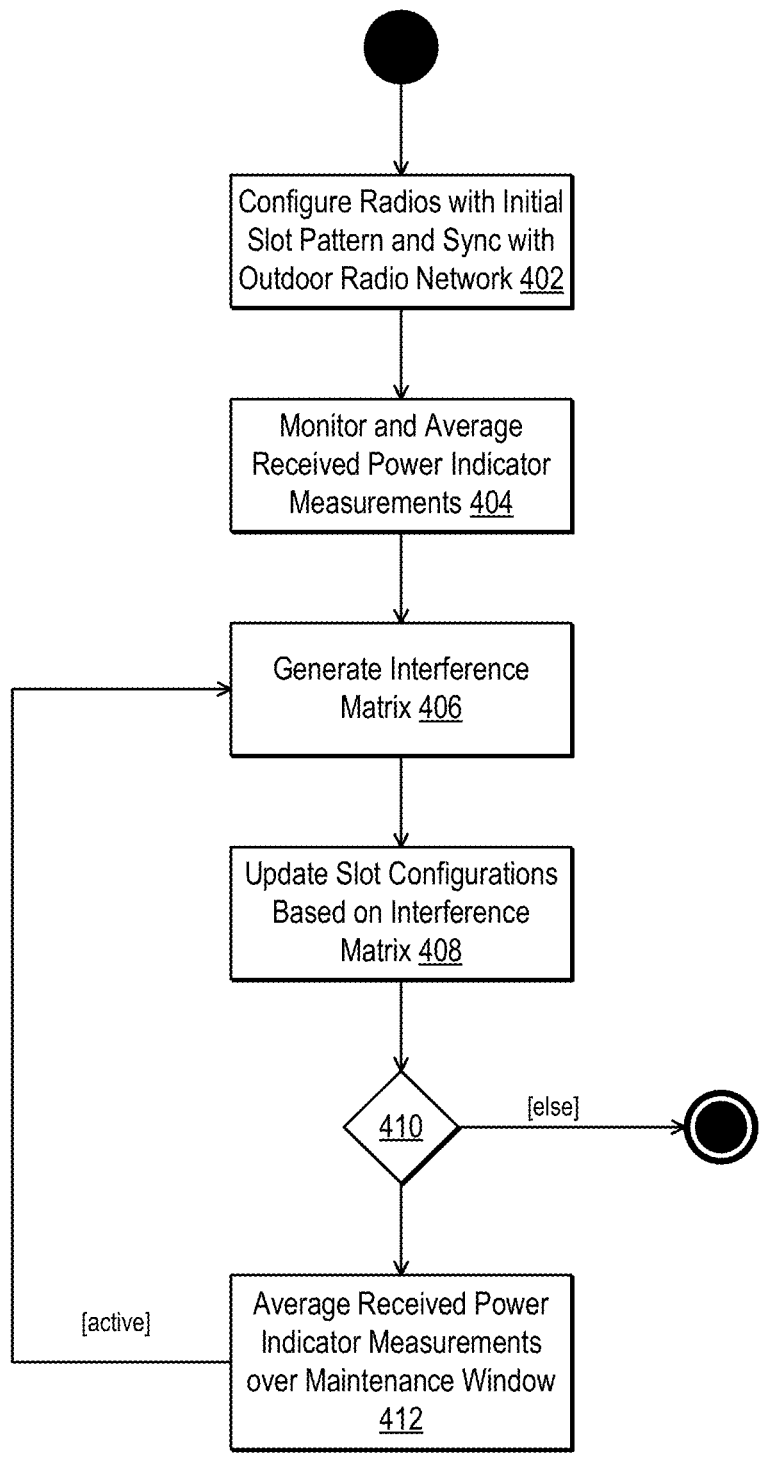
FIG. 4 is a flow diagram illustrating a method for dynamically adjusting a slot configuration of a radio.
Figure 5:
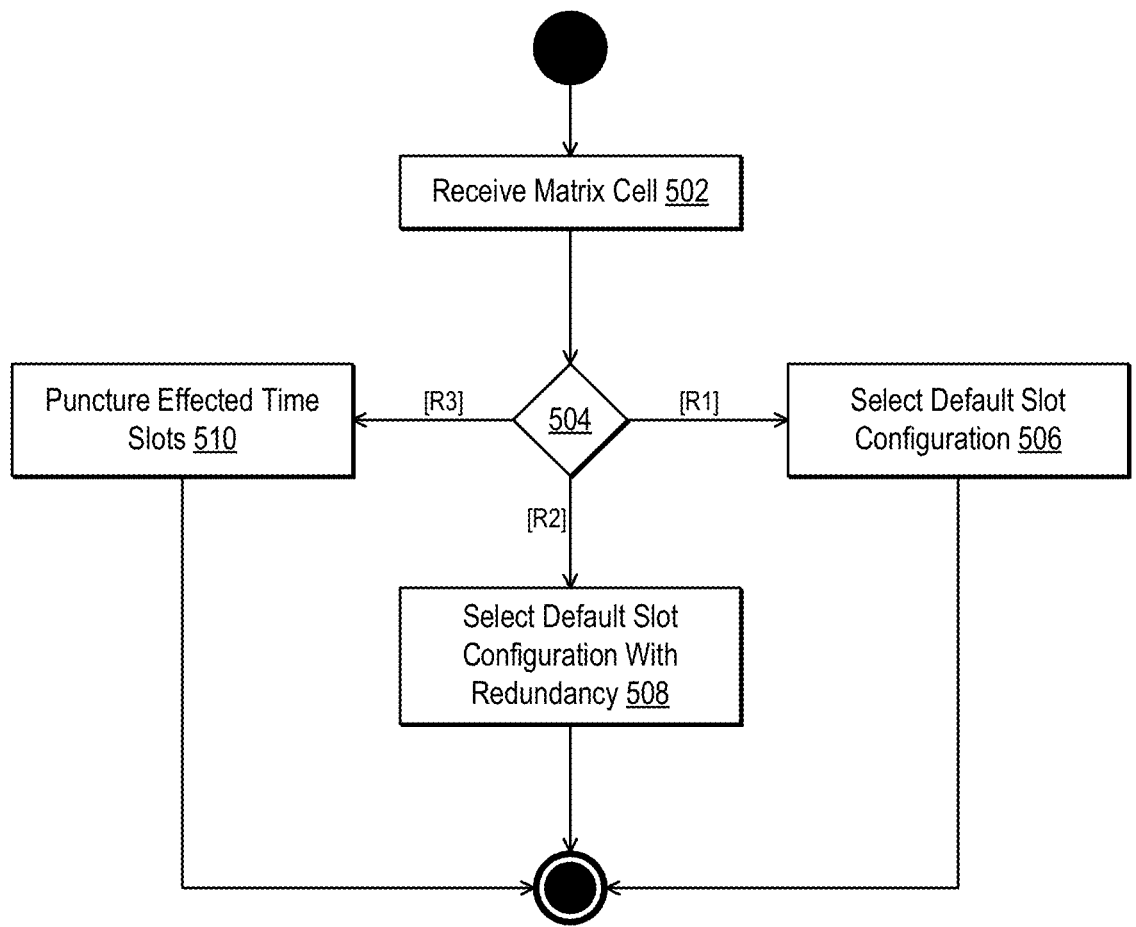
FIG. 5 is a flow diagram illustrating a method for adjusting a slot configuration.
Figure 6:
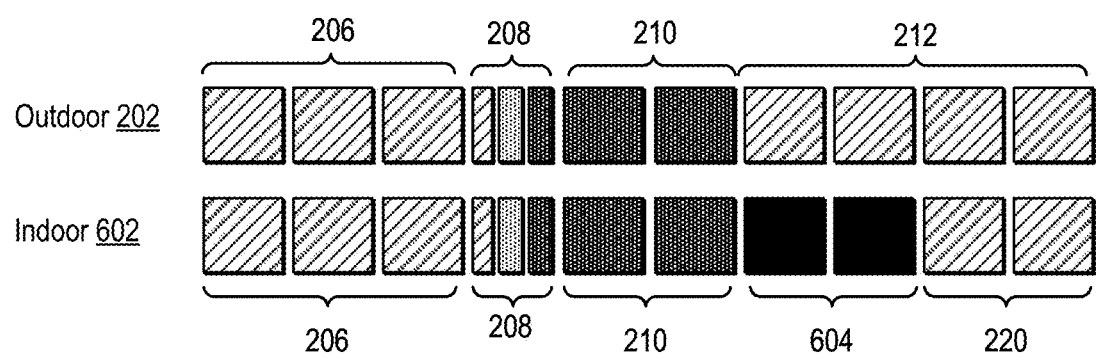
FIG. 6 is a slot diagram illustrating slot configurations of an outdoor system and indoor system.

Further details on the operations of component 310, matrix generator 312, and interference engine 314 are provided herein with respect to FIGS. 4 through 6. In some implementations, the methods of FIGS. 4 and 5 (and operations of component 310, matrix generator 312, and interference engine 314) may be executed by a device comprising a processor and a storage medium for tangibly storing thereon program logic for execution by the processor, the stored program logic storing program code for executing the methods. Alternatively, the methods of FIGS. 4 and 5 (and operations of component 310, matrix generator 312, and interference engine 314) may be executed by virtual computing devices or network functions.

FIG. 4 is a flow diagram illustrating a method for dynamically adjusting a slot configuration of a radio.

In step 402, the method can include configuring one or more radios of an indoor system with an initial slot configuration and syncing the one or more radios with an outdoor radio network.

In some implementations, both outdoor and indoor systems can be time synchronized, sharing a common clock, phase reference, and frame duration. However, the outdoor and indoor networks may use dissimilar TDD patterns. Synchronization may be achieved for example, via Coordinated Universal Time (UTC). Other service providers in the vicinity may also be synchronized, whether they operate in cochannel or adjacent channel mode.

In some implementations, the initial slot configuration may comprise any slot configuration. For example, in an indoor system, an initial 1:1 slot configuration may be used in step 402. The specific initial slot configuration is not limiting and may be selected based on the needs of the system as discussed previously. In some implementations, an operator may use a standards-based feature such as TDD-UL-DL-ConfigurationCommon as defined (for example), to specify this initial slot configuration. In some implementations, the indoor radios may further be frequency and phase-synchronized with an outdoor cellular network having a different TDD slot configuration (e.g., 8:2).

In step 404, the method can include executing received power indicator measurements on the indoor radios and averaging the received power indicator measurements.

In some implementations, step 404 can be executed prior to loading the indoor system with user traffic. In some implementations, one or more pre-loaded scripts can be executed to cause the radios to transmit data in a fixed pattern (to reduce transmission anomalies). In some implementations, the radios may be disabled for UE communications during this initial stage. In this stage, each radio may measure the received power indicator values for each slot and each frequency and report these to a monitoring system. In some implementations, the method may only measure the received power indicator values for uplink slots. In some implementations, the received power indicator measurements may be collected by an active cellular system. In other implementations, the received power indicator measurements may be recorded by auxiliary test equipment installed near to the radio(s) being analyzed.

In step 406, the method can include generating a multi-dimensional interference matrix, array, or similar data structure.

In some implementations, the multi-dimensional interference matrix may be a three-dimensional matrix having the shape L×N×M, where L represents the number of radios, N represents the number of carriers or frequencies supported, and M represents the number of slots. As discussed, the disclosure is not limited, however, to only a three-dimensional matrix. In some implementations, each received power indicator measurement for a given cell in the multi-dimensional matrix may be averaged over a time window and the average received power indicator measurement can be stored in the multi-dimensional matrix. Using this multi-dimensional matrix, a given cell represents a combination of a radio, frequency, and slot and thus can uniquely identify a specific slot using a specific frequency for a specific radio.

In step 408, the method can include updating slot configurations based on the multi-dimensional interference matrix. In some implementations, an interference engine can receive the multi-dimensional interference matrix which can then identify which combination of radio, frequency, and time slot are experiencing interference. In some implementations, the interference engine can then work in conjunction with upper layers of the cellular network and/or a radio scheduler to adjust one or more slot configurations used by one or more radios.

In a 5G NR system, time slots may be static, semi-static, or full adaptive. In some implementations, updating a slot configuration can include transmitting a high level (e.g., Layer 3) message to the radio to update its slot configuration. This message may include the desired slot configuration (selected as described in FIG. 5). In some implementations, the message may be a radio resource control (RRC) message, such as an RRC Connection Reconfiguration message. Further reference is made to FIG. 5 for the implementation details of step 408.

In step 410, the method can include determining if at least one radio of the indoor system is still active. In essence, step 410 enables the method to operate continuously while the indoor radio system is operational. If there are no radios operational, the method may end and be restarted when a radio comes online.

In step 412, the method can include averaging received power indicator measurements over a maintenance window. As illustrated, when the maintenance window expires, the method returns to step 406 and generates a new multi-dimensional interference matrix representing the maintenance window. Then, the method executes step 408 to update slot configurations based on the interference detected during the maintenance window. Thus, as illustrated, the method can continuously update slot configurations until the radios are turned off.

In some implementations, step 412 can be performed in a manner similar to that of step 404, the details of which are not repeated herein.

In some implementations, a network operator can select a period T (e.g., days, weeks or months), where a sample population of the indoor radios repeats the measurement of received power indicator values. In some implementations, this re-measuring can detect if additional indoor radios or frequencies are affected by the deployment of nearby new or existing high-power outdoor cells, that may induce interference to additional indoor radios not affected before. In some implementations, the maintenance period can be repeated every period T (or as desired by the operator).

FIG. 5 is a flow diagram illustrating a method for adjusting a slot configuration. In some implementations, the method of FIG. 5 may be executed by interference engine 314. FIG. 5 depicts updating a single combination of radio, frequency, and slot. As discussed in FIG. 4, this process of FIG. 5 may be executed for one or more such combinations represented by the cells of the multi-dimensional matrix or similar data structure.

In step 502, the method can include receiving a multi-dimensional matrix cell. Returning briefly to FIG. 4, when executing step 408, the method may iterate through all cells of the multi-dimensional interference matrix. That is, the method can iterate through all combinations of radio, frequency and slot. Thus, FIG. 5 (and thus step 502) represents a single iteration of such a loop. In some implementations, the method of FIG. 5 can be operated on a per-radio and per-frequency basis. That is, the method may first select a radio and frequency from the multi-dimensional matrix, then iterate through the slot cell associated with the combination of radio and frequency and only update the slot configuration after analyzing each slot. In another implementation, the method can select a radio and iterate through all permutations of frequencies and slots before updating the slot configuration. The illustrated example updates a slot configuration for each processed slot for the sake of clarity. However, the foregoing alternatives may be used to reduce the number of commands issued to a radio to update slot configurations.

In step 504, the method can include classifying the received power indicator measurement of the multi-dimensional matrix cell. In some implementations, step 504 can compare the received power indicator measurement to a set of ranges of received power indicator values. In some implementations, three ranges (R1, R2, and R3) may be used. In the following examples, it is presumed that the slots in a given multi-dimensional matrix cell correspond to uplink slots. However, the disclosure is not limited as such.

In some implementations, R1, R2, and R3 may be associated with corresponding preconfigured thresholds Th1 and Th2 such that R1 represents the region below Th1, R2 represents the region between Th1 and Th2, and R3 represents the region above Th2. For example, each of Th1 and Th2 may comprise a received power indicator threshold (in decibels) that define the regions. In some implementations, Th1<Th2. The specific values of Th1 and Th2 are non-limiting. In some implementations, when a given received power indicator measurement is below Th1 (i.e., in R1) the given slot can be considered free of interference. When a given received power indicator measurement is above Th1 but below Th2 (i.e., in R2), the slot can be considered as experiencing low-to-medium interference. Finally, when the received power indicator measurement is above Th2 (i.e., in R3), the slot can be considered as experiencing severe interference making the slot unreliable or severely compromised. In some implementations, the various preconfigured thresholds may be determined empirically via laboratory or field tests based on the maximum level of interference power received and tolerated, leading to a particular target quality of service for a given link (e.g., a particular block error rate, throughput etc.).

If the received power indicator measurement is in range R1, in step 506, the method can include selecting a default slot configuration for the corresponding slot.

If received power indicator measurements for a given slot fall in region R1, its corresponding frequency and radio can maintain the default slot configuration that the radio is currently using (e.g., a 1:1 TDD configuration). In some implementations, this slot configuration can be transmitted using an RRC configuration message.

If the received power indicator measurement is in range R2, in step 508, the method can include selecting a default slot configuration and adding redundancy.

If, on the other hand, the slot is within R2, the slot is experiencing low-to-medium interference. In this scenario, the same slot configuration may be maintained. However, redundancy may be added to the slot configuration. Specifically, in some implementations, the method can analyze interference in uplink slots and add additional uplink slots that redundantly upload a previous slot's symbols. Specifically, in one implementation, a radio scheduler can be configured to Physical Uplink Shared Channel (PUSCH) slot repetition (also referred to as PUSCH aggregation or PUSCH bundling) to repeat the given time slot within a radio frame. In this manner, other frames (e.g., downlink) may be replaced with repeated uplink frames, reducing downlink capacity but ensuring uplink capacity.

If the received power indicator measurement is in range R3, in step 510, the method can include puncturing the affected time slot in the slot configuration.

When a given slot is in range R3 it is experiencing severe interference. In this scenario, the given slot is effectively useless due to excessive interference. Thus, in step 510, the slot configuration can be configured to puncture the slot. In some implementations, puncturing (also referred to as blanking) refers to preventing data transmission during a slot. Thus, when receiving a slot configuration including punctured slots, the radio scheduler prevents all data transmission during the punctured slots, overriding the default slot configuration. In some implementations, this can be accomplished using TDD-UL-DL-ConfigurationCommon and specifying which slots should be punctured.

The use of puncturing or blanking allows other indoor radios that are not experiencing interference to operate in the desired initial (or current) slot configuration. Further, slot puncturing can be used only for those slots with severe interference. While puncturing reduces the total uplink capacity of a radio, UEs will not transmit during those slots saving computational resources of UEs and avoiding wasting computational resources of the radio scheduler. Further, puncturing prevents possible delays for data in other slots caused by sending data in a slot that is experiencing severe interference.

FIG. 6 is a slot diagram illustrating slot configurations of an outdoor system and indoor system when punctured.

The slot configurations in FIG. 6 are similar to that of FIG. 2B and like-numbered elements are not discussed again for the sake of brevity. As discussed in FIG. 2B, slots of indoor system 602 falling within slots 222 were experiencing interference with downlink slots 212. In some implementations, this may be classified as severe interference in region R3. As a result, a radio scheduler can cause slots 604 to be blanked or punctured preventing transmission during slots 222 while maintaining uplink and downlink synchronization with the other slots of outdoor system 202.

As discussed in FIG. 4, once the appropriate slot configuration adjustment is selected in the method of FIG. 5, an interference engine can transmit an appropriate message to update the slot configuration of any affected radio.

Figure 7:
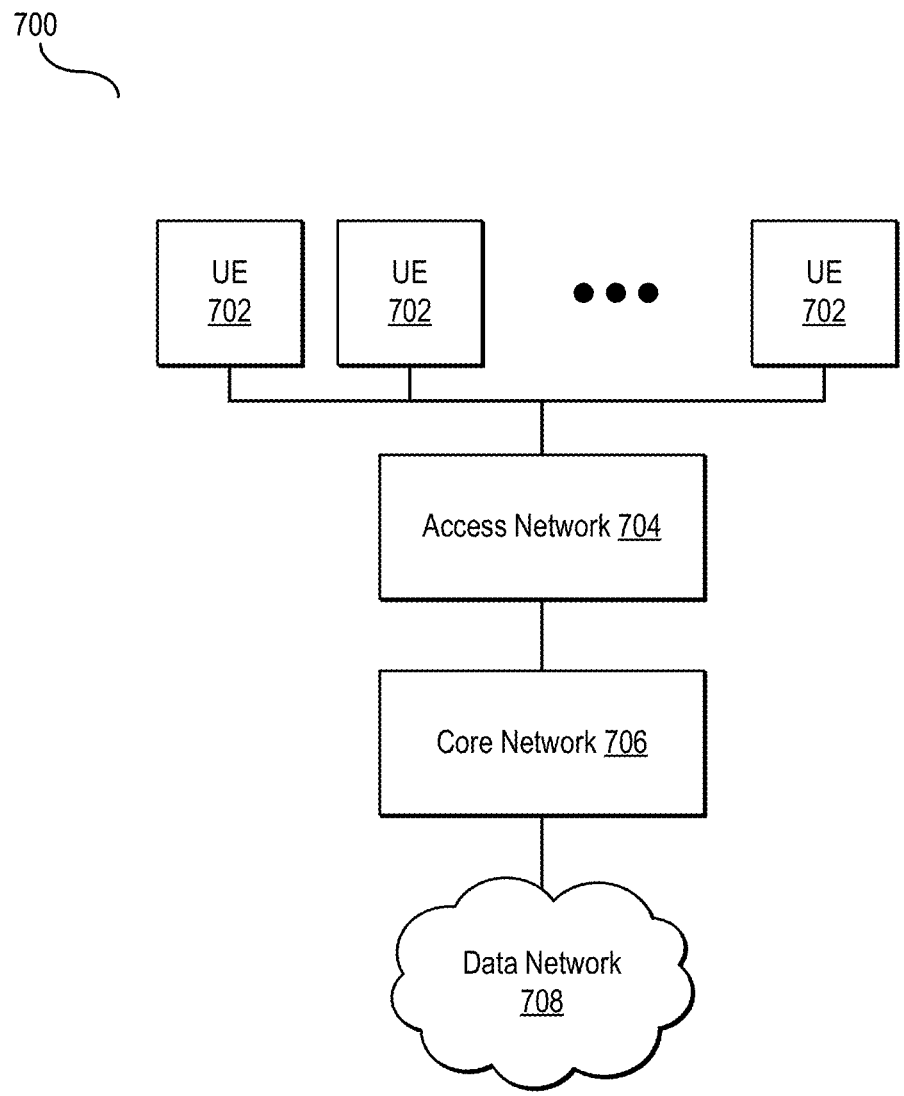
FIG. 7 is a block diagram of a cellular network according to some embodiments.

FIG. 7 is a block diagram of a cellular network according to some embodiments.

As illustrated, a system 700 includes UE 702 that accesses a data network 708) via an access network 704 and a core network 706. In the illustrated embodiment, UE 702 comprises any computing device capable of communicating with the access network 704. As examples, UE 702 may include mobile phones, smartphones, tablets, laptops, sensors, Internet of Things (IoT) devices, and any other devices equipped with a cellular transceiver. One example of a UE is provided in FIG. 9.

In the illustrated embodiment, the access network 704 comprises a network allowing over-the-air network communication with UE 702. In general, the access network 704 includes at least one base station that is communicatively coupled to the core network 706 and wirelessly coupled to UE 702.

In one embodiment, the access network 704 comprises a fifth-generation (5G) cellular access network. In one embodiment, the access network 704 and UE 702 comprise a NextGen Radio Access Network (NG-RAN). In an embodiment, the access network 704 includes a plurality of next Generation Node B (gNodeB) base stations connected to UE 702 via an air interface. In one embodiment, the air interface comprises a New Radio (NR) air interface. In some embodiments, an NR interface utilizes a Cyclic Prefix Orthogonal Frequency-Division Multiple Access (CP-OFDM) downlink modulation scheme and either CP-OFDM or Discrete Fourier Transform Spread Orthogonal Frequency Division Multiplexing (DFT-s-OFDM) uplink modulation scheme. In these embodiments, the gNodeB provides all functionality to implement and operate the air interface and negotiates uplinks and downlinks with the UE 702. The gNodeB may additionally include multiple network interfaces for communicating with the core network 706. In one embodiment, the gNodeB includes an interface to communicate with a mobility manager (e.g., an AMF) and a second interface to communicate with one or more gateway elements in the core network 706, such as an SMF for control data or a UPF for user data. In one embodiment, the mobility manager manages control plane traffic while the gateway elements manage user data traffic, as will be discussed. In some embodiments, base stations in the access network 704 are communicatively connected. For example, in a 5G network, individual gNodeB devices can be communicatively coupled via an X2 interface.

In one embodiment, the access network 704 comprises a fourth-generation (4G) cellular access network. In some embodiments, the access network 704 comprises an LTE access network. In one embodiment, the access network 704 and UE 702 comprise an Evolved Universal Mobile Telecommunications System (UMTS) Terrestrial Radio Access Network (E-UTRAN). In an embodiment, the access network 704 includes a plurality of Evolved Node B (eNodeB) base stations connected to UE 702 via an air interface. In one embodiment, the air interface comprises an E-UTRAN Uu or LTE Uu radio air interface. In some embodiments, an E-UTRAN Uu interface utilizes an orthogonal frequency-division multiple access (OFDMA) downlink modulation scheme and a single-carrier frequency-division multiple access (SC-FDMA) uplink modulation scheme. In these embodiments, the eNodeB provides all functionality to implement and operate the air interface and negotiates uplinks and downlinks with the UE 702. The eNodeB may additionally include multiple network interfaces for communicating with the core network 706. In one embodiment, the eNodeB includes an interface to communicate with a mobility manager (e.g., a Mobility Management Entity, MME) and a second interface to communicate with one or more gateway elements in the core network 706, such as an S-GW or P-GW. In one embodiment, the mobility manager manages control plane traffic while the gateway elements manage user data traffic, as will be discussed. In some embodiments, base stations in the access network 704 are communicatively connected. For example, in a 4G network, individual eNodeB devices can be communicatively coupled, for example, via an X2 interface or any other interface.

In some embodiments, the access network may operate in Carrier Aggregation (CA) mode, with intra-band or inter-band carrier aggregation. In other embodiments the access network 704 may operate in a dual-connectivity mode wherein UE 702 connects to multiple base stations in the access network 704 simultaneously. In some embodiments, dual connectivity may be implemented via New Radio Dual Connectivity (NR-DC), E-UTRA-NR Dual Connectivity (EN-DC), NG-RAN-E-UTRA-NR Dual Connectivity (NGEN-DC), or NR-E-UTRA Dual Connectivity (NE-DC).

In the illustrated embodiment, the access network 704 provides access to a core network 706 to the UE 702. In the illustrated embodiment, the core network may be owned and/or operated by a mobile network operator (MNO) and provides wireless connectivity to UE 702. In the illustrated embodiment, this connectivity may comprise voice and data services. The core network 706 includes various computing devices, which are described briefly herein. Further detail of such devices is provided in FIG. 8.

At a high level, the core network 706 may include a user plane and a control plane. In one embodiment, the control plane comprises network elements and communications interfaces to allow for the management of user connections and sessions. By contrast, the user plane may comprise network elements and communications interfaces to transmit user data from UE 702 to elements of the core network 706 and to external network-attached elements in a data network 708 such as the Internet. An example of a control plane function comprises authenticating that a user can access the core network 706 (i.e., is a subscriber to the MNO). An example of a user plane function is the request and receipt of data from an external web server (e.g., via a web browser on a UE). Many other examples exist in a 4G or 5G network, and the foregoing examples are not intended to be limiting.

Generally, the core network 706 may include a mobility manager, one or more gateways (e.g., a serving gateway and packet gateway), and a subscriber database. In practice, the core network 706 may include more components than these. In a 4G network, the mobility manager may be implemented by an MME, the serving gateway by an S-GW, the packet gateway by a P-GW, and the subscriber database by an HSS. In a 5G network, the mobility manager may be implemented by an Access Mobility Management Function (AMF), Session Management Function (SMF), and an Authentication Server Function (AUSF). Specifically, the AMF performs mobility management while the SMF performs session management, both of which are described herein. Further, the AUSF obtains authentication vectors from a subscriber database. In a 4G network, the Mobility Management Entity (MME) performs all these functions. The 4G serving gateway (S-GW) in a 5G network may be implemented by the SMF as well. Specifically, packet routing from the base station to the packet gateway may be handled by the SMF in contrast to the S-GW in a 4G network. In a 5G network, the packet gateway function user plane may be implemented by the UPF, which provides packet routing from the serving gateway to external services and manages Internet Protocol (IP) address allocation as well as content filtering and blocking. In a 5G network, the subscriber database may be implemented by a UDR, which stores the subscriber data. Access to the UDR may be mediated by a UDM, which is part of the subscriber database, as described herein.

In brief, a UE 702 communicates with the mobility manager to authenticate and establish a session or bearer with the serving and packet gateways. The mobility manager accesses the subscriber data to confirm the UE 702 identity and communicates with the serving gateway to establish the session. Once established, the UE 702 transmits data requests through the session to the packet gateway, which manages the transmitting and receiving data to and from external network services. Specific details of these elements are provided in the following figures.

In the illustrated embodiment, the access network 704 and the core network 706 are operated by an MNO. However, in some embodiments, networks 704, 706 may be operated by a private entity and may be closed to public traffic. For example, the components of the core network 706 may be provided as a single device, and the access network 704 may comprise a small form-factor base station. In these embodiments, the operator of the device can simulate a cellular network, and UE 702 can connect to this network akin to connecting to a national or regional network.

Figure 8:
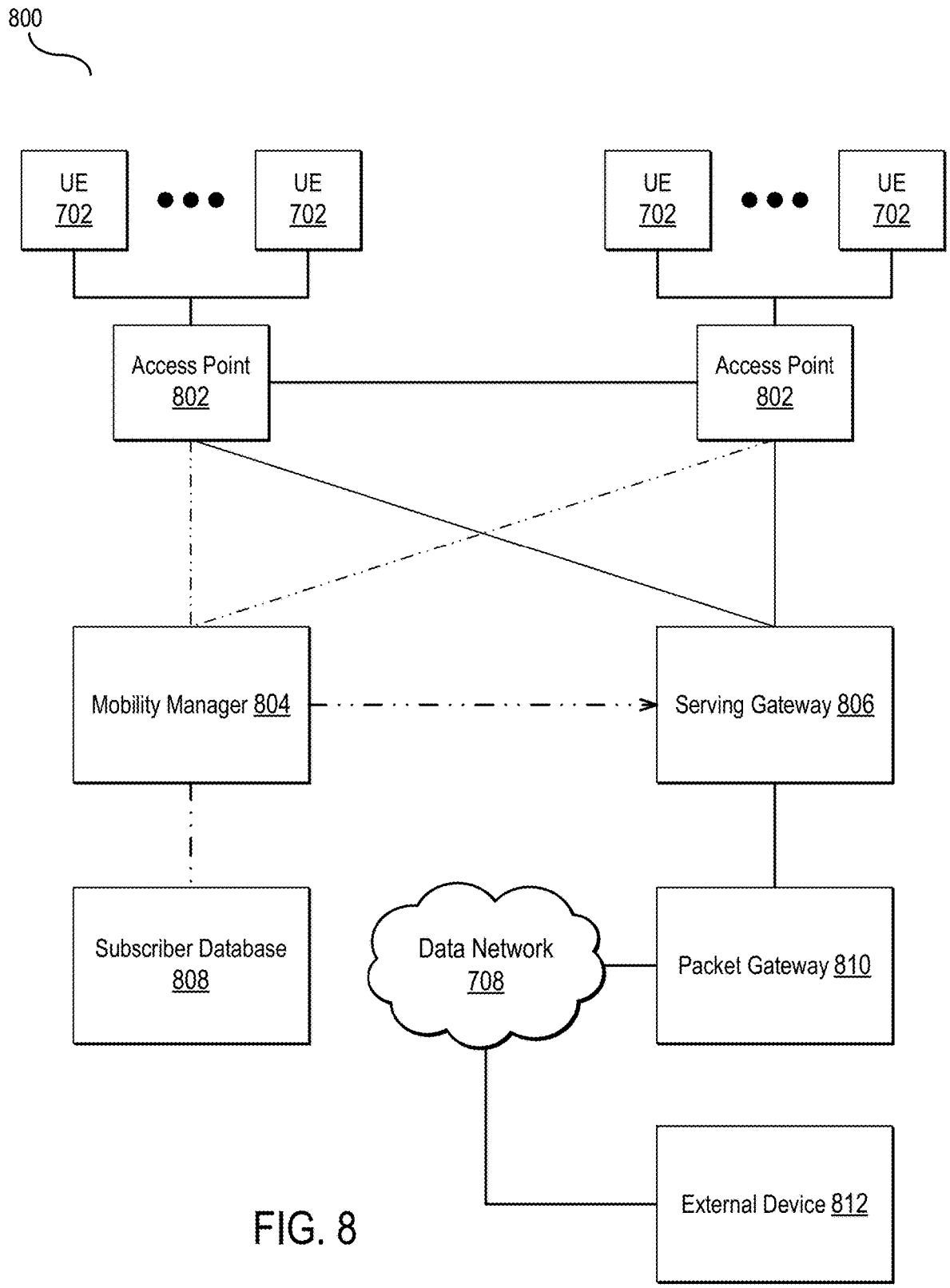
FIG. 8 is a block diagram illustrating a cellular network according to some embodiments.

FIG. 8 is a block diagram illustrating a cellular network according to some embodiments.

In the illustrated embodiment, a system 800 includes UE 702 communicatively connected to access points 802. As seen in FIG. 8, the access points 802 form an access network such as access network 704. In one embodiment, the access points 802 and UE 702 comprise a NextGen Radio Access Network (NG-RAN). In an embodiment, access points 802 comprise a plurality of gNodeB base stations connected to UE 702 via an air interface. In one embodiment, the air interface comprises a New Radio (NR) air interface. The gNodeB additionally includes multiple network interfaces for communicating with the core network and, specifically, mobility manager 804 and serving gateway 806. In one embodiment, the mobility manager 804 in a 5G network comprises an AMF. In one embodiment, the serving gateway 806 comprises an SMF for control data or UPF for user data.

In another embodiment, access points 802 comprise eNodeB base stations connected to UE 702 via an air interface. In some embodiments, the air interface comprises an E-UTRAN Uu or LTE Uu radio air interface. In these embodiments, the eNodeB provides all functionality to implement and operate the air interface and negotiates uplinks and downlinks with the UE 702. The eNodeB additionally includes multiple network interfaces for communicating with the core network and, specifically, mobility manager 804 and serving gateway 806. In one embodiment, the mobility manager 804 comprises an MME in a 4G network. In the illustrated embodiment, solid lines between network elements 804, 806, 808, 810 represent user data traffic, while dashed lines between network elements 804, 806, 808, 810 represent control or Non-Access Stratum (NAS) traffic.

In the illustrated embodiment, the mobility manager 804 manages control plane traffic while the gateway elements 806, 810 manage user data traffic. Specifically, the mobility manager 804 may comprise hardware or software for handling network attachment requests from UE 702. As part of processing these requests, the mobility manager 804 accesses a subscriber database 808. The subscriber database 808 comprises hardware or software that stores user authorization and authentication data and validates users to the network. In some embodiments, the subscriber database 808 may comprise a UDM and UDR in a 5G network. In another embodiment, the subscriber database 808 may comprise an HSS in a 4G network. In one embodiment, the subscriber database 808 may also store a location of the user updated via a Diameter or similar protocol.

The mobility manager 804 may also be configured to create data sessions or bearers between UE 702 and serving gateway 806 or gateway 810. In one embodiment, the serving gateway 806 and gateway 810 may comprise single or separate devices. In general, the serving gateway 806 routes and forwards user data packets while also acting as the mobility anchor for the user plane during access point handovers and as the anchor for mobility between different network technologies. For idle state UE 702, the serving gateway 806 terminates the downlink data path and triggers paging when downlink data arrives for the UE 702. The serving gateway 806 manages and stores UE 702 contexts, e.g., parameters of the IP bearer service, network internal routing information. In a 5G network, the serving gateway 806 may be implemented by an SMF. In a 4G network, the serving gateway 806 may be implemented by an S-GW.

The serving gateway 806 is communicatively coupled to a gateway 810. In general, the gateway 810 provides connectivity from the UE 702 to external Packet Data Networks (PDNs) such as data network 708 by being the point of exit and entry of traffic to external networks (e.g., 708). UE 702 may have simultaneous connectivity with plurality gateways, including gateway 810 for accessing multiple packet data networks. The gateway 810 performs policy enforcement, packet filtering for each user, charging support, lawful interception, and packet screening. In the illustrated embodiment, gateway 810 also limits access to endpoints such as an external device 812. In a 5G network, the gateway 810 may be implemented by a UPF. In a 4G network, the gateway 810 may be implemented by a P-GW.

In the illustrated embodiment, an external device 812 is communicatively coupled to the core network via the data network 708. In one embodiment, the data network 708 may comprise the Internet. In the illustrated embodiment, the external device 812, such as an application server, may comprise any electronic device capable of communicating with the data network 708, and the disclosure is not limited to specific types of network devices.

Figure 9:
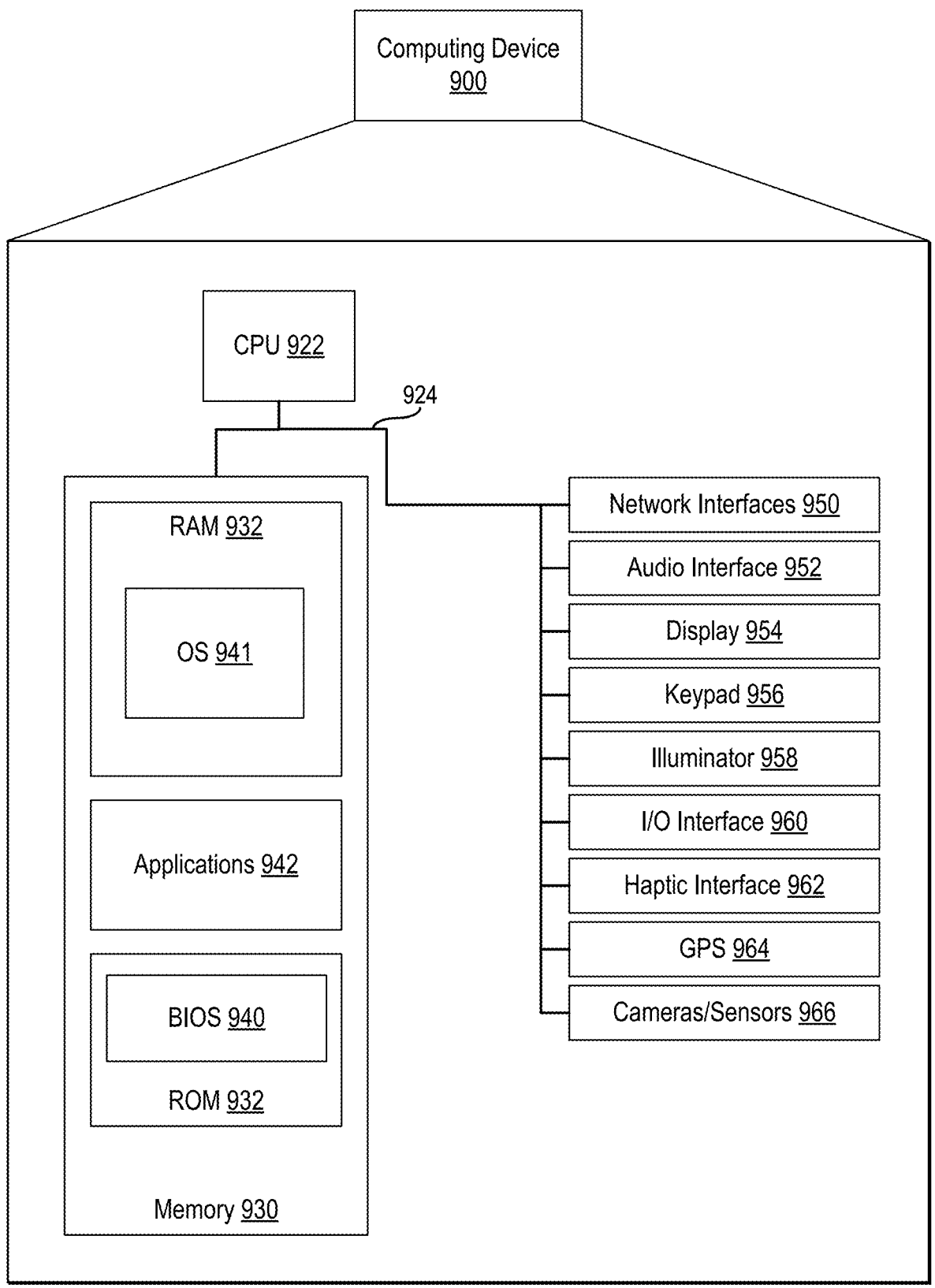
FIG. 9 is a block diagram illustrating a computing device showing an example of a client or server device used in the various embodiments of the disclosure.

FIG. 9 is a block diagram illustrating a computing device showing an example of a client or server device used in the various embodiments of the disclosure.

The computing device 900 may include more or fewer components than those shown in FIG. 9, depending on the deployment or usage of the computing device 900. For example, a server computing device, such as a rack-mounted server, may not include an audio interface 952, display 954, keypad 956, illuminator 958, haptic interface 962, Global Positioning System (GPS) receiver such as GPS receiver 964, or cameras/sensors 966. Some devices may include additional components not shown, such as graphics processing unit (GPU) devices, cryptographic co-processors, artificial intelligence (AI) accelerators, or other peripheral devices.

As shown in the figure, the computing device 900 includes a central processing unit (CPU) 922 in communication with a mass memory 930 via a bus 924. The computing device 900 also includes a network interface 950, an audio interface 952, a display 954, a keypad 956, an illuminator 958, an input/output interface (960), a haptic interface 962, a GPS receiver 964, and a camera(s) or other optical, thermal, or electromagnetic cameras/sensors 966. The computing device 900 can include a plurality of cameras/sensors 966. The positioning of the cameras/sensors 966 on the computing device 900 can change per computing device 900 model, per computing device 900 capabilities, and the like, or some combination thereof.

In some embodiments, the CPU 922 may comprise a general-purpose CPU. The CPU 922 may comprise a single-core or multiple-core CPU. The CPU 922 may comprise a system-on-a-chip (SoC) or a similar embedded system. In some embodiments, a GPU may be used in place of, or in combination with, a CPU 922. Mass memory 930 may comprise a dynamic random-access memory (DRAM) device, a static random-access memory device (SRAM), or a Flash (e.g., NAND Flash) memory device. In some embodiments, mass memory 930 may comprise a combination of such memory types. In one embodiment, the bus 924 may comprise a Peripheral Component Interconnect Express (PCIe) bus. In some embodiments, bus 924 may comprise multiple busses instead of a single bus.

Mass memory 930 illustrates another example of computer storage media for the storage of information such as computer-readable instructions, data structures, program modules, or other data. Mass memory 930 stores a basic input/output system, BIOS 940, for controlling the low-level operation of the computing device 900. The mass memory also stores an operating system 941 for controlling the operation of the computing device 900

Applications 942 may include computer-executable instructions which, when executed by the computing device 900, perform any of the methods (or portions of the methods) described previously in the description of the preceding Figures. In some embodiments, the software or programs implementing the method embodiments can be read from a hard disk drive (not illustrated) and temporarily stored in RAM 932 by CPU 922. CPU 922 may then read the software or data from RAM 932, process them, and store them in RAM 932 again.

The computing device 900 may optionally communicate with a base station (not shown) or directly with another computing device. Network interface 950 is sometimes known as a transceiver, transceiving device, or network interface card (NIC).

The audio interface 952 produces and receives audio signals such as the sound of a human voice. For example, the audio interface 952 may be coupled to a speaker and microphone (not shown) to enable telecommunication with others or generate an audio acknowledgment for some action. Display 954 may be a liquid crystal display (LCD), gas plasma, light-emitting diode (LED), or any other type of display used with a computing device. Display 954 may also include a touch-sensitive screen arranged to receive input from an object such as a stylus or a digit from a human hand.

Keypad 956 may comprise any input device arranged to receive input from a user. Illuminator 958 may provide a status indication or provide light.

The computing device 900 also comprises an input/output interface (960) for communicating with external devices, using communication technologies, such as USB, infrared, Bluetooth™, or the like. The haptic interface 962 provides tactile feedback to a user of the client device.

The GPS receiver 964 can determine the physical coordinates of the computing device 900 on the surface of the Earth, which typically outputs a location as latitude, longitude and elevation (x,y,z) values. GPS receiver 964 can also employ other geo-positioning mechanisms, including, but not limited to, triangulation, assisted GPS (AGPS), E-OTD, CI, SAI, ETA, BSS, or the like, to further determine the physical location of the computing device 900 on the surface of the Earth. In one embodiment, however, the computing device 900 may communicate through other components, provide other information that may be employed to determine the physical location of the device, including, for example, a MAC address, IP address, or the like.

The present disclosure has been described with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, the reasonably broad scope for claimed or covered subject matter is intended. Among other things, for example, the subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in some embodiments" as used herein does not necessarily refer to the same embodiment, and the phrase "in another embodiment" as used herein does not necessarily refer to a different embodiment. It is intended, for example, that claimed subject matter includes combinations of example embodiments in whole or in part.

In general, terminology may be understood at least in part from usage in context. For example, terms such as "and," "or," or "and/or," as used herein may include a variety of meanings that may depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, can be understood to convey a singular usage or to convey a plural usage, depending at least in part upon context. In addition, the term "based on" may be understood as not necessarily intended to convey an exclusive set of factors and may, instead, allow for the existence of additional factors not necessarily expressly described, again, depending at least in part on context.

The present disclosure has been described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur in different orders than illustrated. For example, two blocks shown in succession can, in fact, be executed substantially concurrently, or the blocks can sometimes be executed in the reverse order, depending upon the functionality/acts involved.

For the purposes of this disclosure, a non-transitory computer-readable medium (or computer-readable storage medium/media) stores computer data, which data can include computer program code (or computer-executable instructions) that is executable by a computer, in machine-readable form. By way of example, and not limitation, a computer-readable medium may comprise computer-readable storage media for tangible or fixed storage of data or communication media for transient interpretation of code-containing signals. Computer-readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer-readable storage media includes, but is not limited to, RAM, ROM, EPROM, EEPROM, flash memory or other solid-state memory technology, CD-ROM, DVD, or other optical storage, cloud storage, magnetic cassettes, magnetic tape, magnetic disk storage, or other magnetic storage devices, or any other physical or material medium which can be used to tangibly store the desired information or data or instructions and which can be accessed by a computer or processor.

In the preceding specification, various example embodiments have been described with reference to the accompanying drawings. However, it will be evident that various modifications and changes may be made thereto, and additional embodiments may be implemented without departing from the broader scope of the disclosed embodiments as set forth in the claims that follow. The specification and drawings are accordingly to be regarded in an illustrative rather than restrictive sense.

I claim:

1. A method comprising:
   monitoring interference measurements of a radio in a cellular network;
   generating a multi-dimensional interference matrix based on the interference measurements, the multi-dimensional interference matrix storing averages of the interference measurements for a plurality of combinations of radios, frequencies, and time slots;
   analyzing the multi-dimensional interference matrix to determine at least one combination of the radio, frequency, and time slot in the plurality of combinations having an interference measurement exceeding a preconfigured threshold; and
   updating a slot configuration of the at least one combination based on the interference measurement.

2. The method of claim 1, wherein the interference measurements comprise received power indicator measurements.

3. The method of claim 1, wherein generating a multi-dimensional interference matrix based on the interference measurements comprises generating a three-dimensional matrix, the three-dimensional matrix having dimensions for radios, frequencies used by the radios, and slot numbers within frames transmitted using the frequencies.

4. The method of claim 1, wherein the time slots comprise uplink slots.

5. The method of claim 1, wherein updating a slot configuration of the at least one combination comprises:

selecting a cell in the multi-dimensional interference matrix corresponding to a slot with a frequency supported by the radio;
determining that one or more time slots are subject to interference exceeding preconfigured thresholds; and
updating the slot configuration to include at least one redundant uplink slot.

6. The method of claim 1, wherein updating a slot configuration of the at least one combination comprises:
selecting a cell in the multi-dimensional interference matrix corresponding to a slot with a frequency supported by the radio;
determining that one or more time slots are subject to interference that exceed preconfigured thresholds; and
puncturing the slot in the slot configuration, wherein puncturing the slot comprises preventing data transmission during the slot.

7. The method of claim 1, further comprising generating a second multi-dimensional interference matrix for the radio during a maintenance window and further updating the slot configuration of the radio when one or more cells in the second multi-dimensional interference matrix store an interference measurement exceeding the preconfigured threshold.

8. A non-transitory computer-readable storage medium for tangibly storing computer program instructions capable of being executed by a computer processor, the computer program instructions defining steps of:
monitoring interference measurements of a radio in a cellular network;
generating a multi-dimensional interference matrix based on the interference measurements, the multi-dimensional interference matrix storing averages of the interference measurements for a plurality of combinations of radios, frequencies, and time slots;
analyzing the multi-dimensional interference matrix to determine at least one combination of the radio, frequency, and time slot in the plurality of combinations having an interference measurement exceeding a preconfigured threshold; and
updating a slot configuration of the at least one combination based on the interference measurement.

9. The non-transitory computer-readable storage medium of claim 8, wherein the interference measurements comprise received power indicator measurements.

10. The non-transitory computer-readable storage medium of claim 8, wherein generating a multi-dimensional interference matrix based on the interference measurements comprises generating a three-dimensional matrix, the three-dimensional matrix having dimensions for radios, frequencies used by the radios, and slot numbers within frames transmitted using the frequencies.

11. The non-transitory computer-readable storage medium of claim 8, wherein the time slots comprise uplink slots.

12. The non-transitory computer-readable storage medium of claim 8, wherein updating a slot configuration of the at least one combination comprises:
selecting a cell in the multi-dimensional interference matrix corresponding to a slot with a frequency supported by the radio;
determining that one or more time slots are subject to interference exceeding the preconfigured thresholds; and
updating the slot configuration to include at least one redundant uplink slot.

13. The non-transitory computer-readable storage medium of claim 8, wherein updating a slot configuration of the at least one combination comprises:
selecting a cell in the multi-dimensional interference matrix corresponding to a slot with a frequency supported by the radio;
determining that one or more time slots are subject to interference exceeding preconfigured thresholds; and
puncturing the slot in the slot configuration, wherein puncturing the slot comprises preventing data transmission during the slot.

14. The non-transitory computer-readable storage medium of claim 8, the steps further comprising generating a second multi-dimensional interference matrix for the radio during a maintenance window and further updating the slot configuration of the radio when one or more cells in the second multi-dimensional interference matrix store an interference measurement exceeding the preconfigured threshold.

15. A device comprising:
a processor configured to:
monitor interference measurements of a radio in a cellular network,
generate a multi-dimensional interference matrix based on the interference measurements, the multi-dimensional interference matrix storing averages of the interference measurements for a plurality of combinations of radios, frequencies, and time slots,
analyzing the multi-dimensional interference matrix to determine at least one combination of the radio, frequency, and time slot in the plurality of combinations having an interference measurement exceeding a preconfigured threshold, and
update a slot configuration of the at least one combination based on the interference measurement.

16. The device of claim 15, wherein the interference measurements comprise received power indicator measurements.

17. The device of claim 15, wherein generating a multi-dimensional interference matrix based on the interference measurements comprises generating a three-dimensional matrix, the three-dimensional matrix having dimensions for radios, frequencies used by the radios, and slot numbers within frames transmitted using the frequencies.

18. The device of claim 15, wherein the time slots comprise uplink slots.

19. The device of claim 15, wherein updating a slot configuration of the at least one combination comprises:
selecting a cell in the multi-dimensional interference matrix corresponding to a slot with a frequency supported by the radio;
determining that one or more time slots are subject to interference exceeding preconfigured thresholds; and
updating the slot configuration to include at least one redundant uplink slot.

20. The device of claim 15, wherein updating a slot configuration of the at least one combination comprises:
selecting a cell in the multi-dimensional interference matrix corresponding to a slot with a frequency supported by the radio;
determining that one or more time slots are subject to interference exceeding preconfigured thresholds; and
puncturing the slot in the slot configuration, wherein puncturing the slot comprises preventing data transmission during the slot.

* * * * *